Sept. 18, 1923.

R. H. PLASS 1,468,076

SPRING WHEEL

Filed Aug. 10, 1920

Sept. 18, 1923.
R. H. PLASS
SPRING WHEEL
Filed Aug. 10, 1920
1,468,076
3 Sheets-Sheet 2
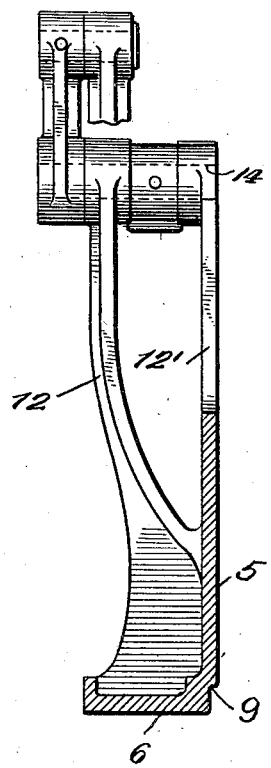
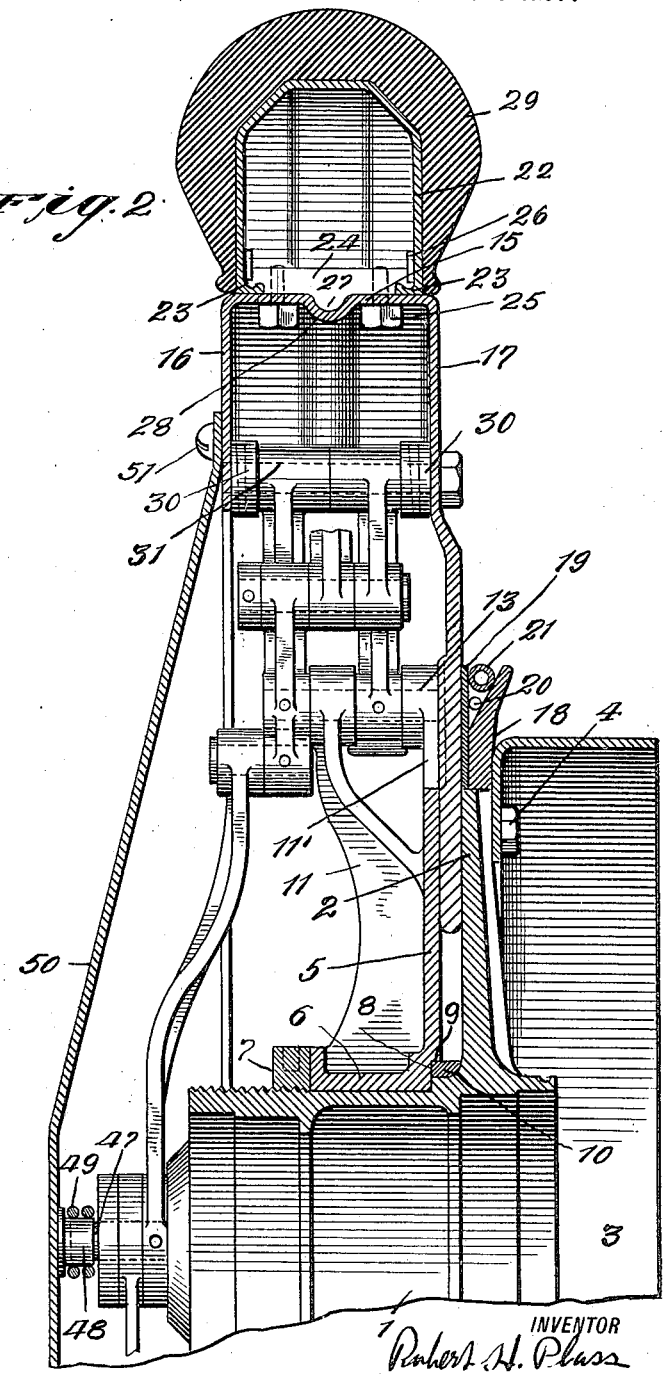
INVENTOR
Robert H. Plass
BY
Moses, Hammond & Middleton
ATTORNEYS Sept. 18, 1923.  
R. H. PLASS  
SPRING WHEEL  
Filed Aug. 10, 1920

Patented Sept. 18, 1923.

1,468,076

UNITED STATES PATENT OFFICE.

ROBERT H. PLASS, OF UPPER MONTCLAIR, NEW JERSEY.

SPRING WHEEL.

Application filed August 10, 1920. Serial No. 402,647.

*To all whom it may concern:*

Be it known that I, ROBERT H. PLASS, a citizen of the United States, residing in Upper Montclair, county of Essex, and State of New Jersey, have invented certain new and useful Improvements in Spring Wheels, of which the following is a specification.

This invention relates to improvements in spring wheels and has for its object to provide a wheel of this character which will be positive and efficient in operation, and which will consist of but few parts, thereby simplifying its construction and reducing the cost of manufacture thereof.

The invention further has for its object to provide a spring wheel having a hub and a floating rim so connected to one another that the rim cannot rotate concentrically with respect to the hub while being capable of a limited radial or eccentric movement with respect thereto.

The invention further has for its object to provide a spring wheel provided with means for absorbing sudden shocks and jars whereby the vehicle will operate in a smooth manner, and in which the several co-acting movable parts will operate with minimum friction and without noise.

Other objects will in part be obvious and in part pointed out hereinafter.

In the accompanying drawings forming part of this specification, wherein I have shown a preferred embodiment of my invention for the purpose of illustrating the principle thereof:—

Figure 1 is a side elevation of a spring wheel constructed in accordance with and embodying my invention, the cover plate and outer flange of the floating rim being removed;

Figure 2 is an enlarged detail sectional view taken substantially on the line II—II of Figure 1;

Figure 3 is a detail view, partly in section, of a part of the disc and some of the elements associated therewith.

Figure 4:
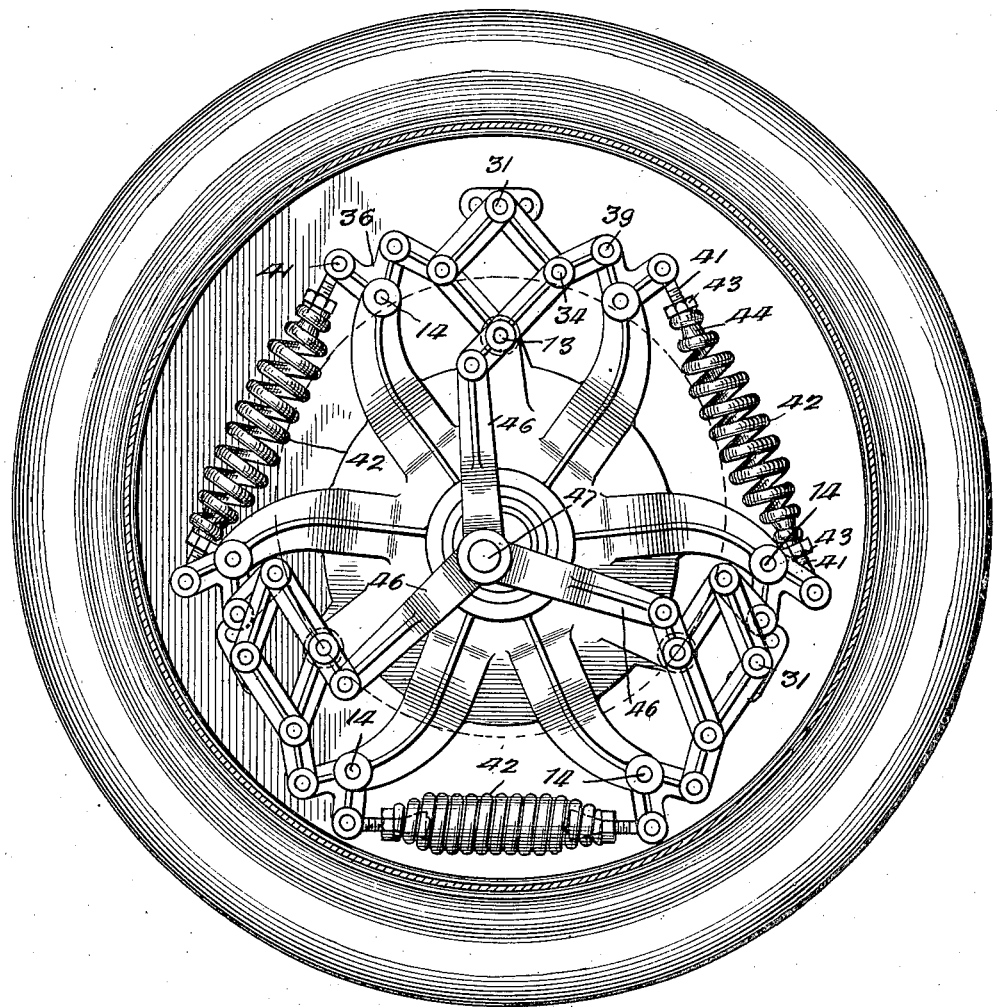
Figure 4 is a view similar to Figure 1 illustrating the position of the parts when relative movement takes place between the hub and the floating rim.

Referring to the drawings, the wheel includes a hub 1 provided at its inner end with an outwardly-extending annular flange 2 to which a brake drum 3 is secured as by bolts 4. A disc 5 having an annular flange 6 is mounted upon the hub and is secured thereto by a nut 7. The disc engages a shoulder 8 on the hub, whereby it is held in spaced relation to the flange 2 of the hub. Clamped between a shoulder 9 on the disc 5 and the hub is a ring 10, formed of brass or the like, which serves as a stop to limit the radial or eccentric movement of the floating rim as hereinafter described. The disc 5 is provided with a plurality of sets of radially-extending arms 11, 11' and 12, 12' arranged in pairs and having their outer or free ends spaced from and registering with one another, the arms 12, 12' being longer than the arms 11, 11'. Studs 13 are secured within perforations formed in the outer ends of the arms 11, 11' and studs 14 are secured in a similar manner to the outer ends of the arms 12, 12'.

The floating rim, which is preferably formed of sheet metal, is shown as comprising an annular rim portion 15 provided with outer and inner annular flanges 16 and 17, the flange 17 being of greater width than the flange 16 and slidably positioned between the disc 5 and the flange 2 of the hub 1. Surrounding the flange 2 and interposed between the flange 17 of the floating rim and the brake drum 3 is an annular packing ring 18 to which is secured packing 19, of any suitable material. The outer edge of the packing ring flares outwardly from the packing 19 to form a V-shaped recess within which is positioned a ring 20 preferably formed of solid rubber, and an endless leather-covered spring 21 which serve to press the packing against the flange of the floating rim and to form a dust and oil proof sliding joint therewith. Mounted upon the rim portion 15 of the floating rim is a substantially U-shaped, tread-supporting member 22 having inwardly-extending flanges 23 engaging the rim portion 15. The member 22 is secured to the floating rim by means of clamps 24 engaging the flanges 23 and secured to the rim by bolts 25. Each clamp is securely held in proper position by having its ends engage the plates 26 secured to the member 22 and by having a projection 27 formed on its under surface which engages a correspondingly shaped annular depression 28 formed in the rim portion 15 of the floating rim. The tread-supporting member 22 upon which a tread 29 of any suitable material is mounted is thus firmly held against circumferential or lateral movement relative to the floating rim. Secured to the inner surfaces of the flanges of the floating rim are a plurality of pairs of registering sockets 30 within which are secured studs 31 positioned in radial register with the studs 13.

Pivotally supported at their outer ends upon each set of studs 13 and 31 are two pairs of oppositely disposed, collapsible and extensible links 32 and 33, the ends of which are pivotally supported upon studs 34 and 35, respectively. These several pairs of links serve to connect the floating rim to the hub and to permit relative radial movement between the rim and the hub. Pivotally supported upon the studs 14 are bell crank levers 36, the arms 37 and 38 of which extend outwardly from the hub of the wheel. Upon the outer ends of the arms 37 are secured studs 39 upon which links 40 are pivotally mounted the other ends of the links being pivotally supported upon the studs 34 and 35. Pivotally supported upon the outer ends of the arms 38 of the bell crank levers are eye-bolts 41, 41, the eye-bolts carried by the adjacent arms constituting supporting means for tension springs 42, the opposite ends of which are secured to the eye-bolts by nuts 43 and 44. The springs serve to prevent relative rotary movement between the hub and the floating rim.

The innermost link of each pair of links 32 is preferably provided with a longitudinally extending portion 45 to which one end of an equalizing link 46 is pivotally connected. The other ends of the links 46 are pivotally mounted upon a stud 47 normally occupying a position concentric with the center of the hub. Slidingly mounted upon the outer end of the stud 47 is a flanged cap 48 pressed outwardly by a coil spring 49 into engagement with the inner surface of a cover plate 50, secured to the flange 16 of the floating rim by screws 51, and forming a dust and oil proof joint. As the cover plate 50 and the packing 19 form oil tight joints with the floating rim, the interior of the wheel may be partially or entirely filled with oil, if desired, in order to maintain the parts properly lubricated. The links 46 and their associated parts may be omitted if desired, in connection with the front wheels, and in cars of comparatively light weight they may also be omitted from the rear wheels.

Under normal conditions the several parts of the wheel assume the positions shown in Figure 1 in which the links 32, 33 of the several sets of collapsible and extensible links are positioned uniformly with respect to one another and the several springs 42 are equally contracted, the inner ends of the equalizing levers 46 being positioned centrally with respect to the hub 1. If, owing to the unevenness of the road, or for any other reason, the floating rim of the wheel is forced upwardly with respect to the hub, or the hub is forced downwardly with respect to the rim, the pairs of links 32 and 33 above the horizontal diameter of the rim will expand more or less while the pairs of links below such diameter will collapse more or less, depending upon their positions relative to the road, and in Figure 4 the positions assumed by the several parts of the wheel, under such conditions, are shown, for one position of the wheel relative to the road. The cooperating movements of the several sets of links 32, 33, are assisted by the connecting links 46, when such links are employed, the pivotal connection of the inner ends thereof shifting its position with respect to the center of the hub, as indicated in Figure 4. As the links 32 and 33 of the several sets are thus actuated the links 40 will be actuated to cause the several bell crank levers 36 to be rocked to a greater or less extent. The springs 42 will thus be caused to expand or stretch, thus increasing the tension thereof, the increase in tension of each spring depending, of course, upon the extent of movement of the bell crank levers to which it is secured. The springs above the horizontal will stretch to a greater degree than the springs below the same. If the wheel is in the position shown in Figure 4 when the upward movement of the floating rim occurs there will be practically no stretching of the lowermost spring for slight upward movements of the rim. By reason of the co-action of the springs and the sets of links 32 and 33 the rim is prevented from rotating concentrically with respect to the hub, but is free to move radially and eccentrically with respect thereto to a limited extent. The springs, of course, serve to take up and absorb any sudden shock or jolt to which the wheel is subjected, thus insuring a smooth running of the vehicle. It is of course understood that several parts of the wheel operate in a similar manner to that above described if the floating rim moves downward with respect to the hub by reason of the wheel dropping into a depression or rut on the road.

While I have illustrated and described my invention in connection with a preferred embodiment thereof, it will be understood that I do not intend to limit myself thereto, but that I intend to cover my invention broadly in whatever form its principle may be employed.

Having thus described my invention, I claim:—

1. In combination, a rim, a hub, toggle linkages for associating the rim with the hub, means for constraining a point on each of said linkages to movement on an arc of a circle described about a center common to said points, and resilient means connected to said linkages but free from connection to said rim for biasing said linkages to a position at which the rim is central to the hub.

2. In combination, a rim, a hub, a plurality of pairs of toggle linkages for associating the rim with the hub, means for constraining a point on each of said pairs of toggle linkages to movement on an arc of a circle described about a center common to said points, and resilient means connected to said linkages but free from connection to said rim for biasing said linkages to a position at which the rim is central to the hub.

3. In combination, a rim, a hub, a plurality of pairs of toggle linkages for associating the rim with the hub, the linkages of each of said pairs being oppositely disposed toward each other and having common pivotal points on said rim and said hub, resilient means for biasing the rim to a position central to the hub and a plurality of members pivotally associated with a link of each of said pairs of toggle linkages, said members having their opposite ends pivotally associated with each other in a common point.

4. In combination, a rim, a hub, a plurality of pairs of toggle linkages for associating the rim with the hub, the linkages of each of said pairs being oppositely disposed toward each other and having common pivotal points on said rim and said hub, a plurality of members pivotally associated with a link of each of said pairs of toggle linkages, said members having their opposite ends pivotally associated with each other in a common point, and resilient means connected between the joints of adjacent toggle linkages for biasing said linkages to a collapsed position.

5. In combination, a rim, a hub, a plurality of pairs of toggle linkages for associating the rim with the hub, the linkages of each of said pairs being oppositely disposed toward each other and having common pivotal points on said rim and said hub, means for constraining a point on each of said pairs of toggle linkages to movement on an arc of a circle common to all of said points, and resilient means for biasing said toggle linkages to a collapsed position, said means comprising a spring, and link mechanism pivotally associated with the hub for connecting the ends of said spring to adjacent joints of adjacent toggle linkages.

In testimony whereof I have affixed my signature to this specification.

ROBERT H. PLASS.